(12) United States Patent
Sethna et al.

(10) Patent No.: US 8,605,135 B1
(45) Date of Patent: Dec. 10, 2013

(54) OPTICAL ENHANCEMENT USING FIBER OPTIC FACEPLATES

(75) Inventors: Vijay M. Sethna, Fremont, CA (US);
Tracy J. Barnidge, Marion, IA (US);
Peter J. Hogan, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 493 days.

(21) Appl. No.: 12/842,170

(22) Filed: Jul. 23, 2010

(51) Int. Cl.
*H04N 13/04* (2006.01)

(52) U.S. Cl.
USPC ............................................................ 348/51

(58) Field of Classification Search
USPC .................................................... 348/42–60
See application file for complete search history.

(56) References Cited

U.S. PATENT DOCUMENTS

| | | | | |
|---|---|---|---|---|
| 3,589,795 A | * | 6/1971 | Miyazaki et al. | 385/120 |
| 5,303,085 A | * | 4/1994 | Rallison | 359/631 |
| 7,190,518 B1 | * | 3/2007 | Kleinberger et al. | 359/465 |
| 7,515,800 B2 | * | 4/2009 | Reichel et al. | 385/120 |

* cited by examiner

*Primary Examiner* — Joseph Ustaris
*Assistant Examiner* — Talha Nawaz
(74) *Attorney, Agent, or Firm* — Donna P. Suchy; Daniel M. Barbieri

(57) ABSTRACT

A display apparatus may include, but is not limited to: an image display device; and a fiber optic plate disposed over a display surface of the image display device. A method for displaying images may include, but is not limited to: generating an image on a display device; receiving light corresponding to the image at a fiber optic plate; and reducing at least one of luminance asymmetry, luminance non-uniformity, and color shift across a viewing angle of the image display device according to a configuration of the fiber optic plate. A method for displaying images may include, but is not limited to: generating a stereoscopic image on a display device; receiving light corresponding to the stereoscopic image at a fiber optic plate; and reducing at least one of luminance asymmetry, luminance non-uniformity, and color shift across a viewing angle and may also reduce/eliminate reverse-stereoscopic effects in the stereoscopic image according to a configuration of the fiber optic plate.

8 Claims, 17 Drawing Sheets

OPTICAL ENHANCEMENT USING FIBER OPTIC FACEPLATES

BACKGROUND

Conventional LCD displays may suffer from limited viewing angles, asymmetry, non-uniformity, color variation and gray scale reversal over varying viewing angles. In addition, Stereoscopic LCD displays may exhibit reverse stereoscopic effects over varying viewing angles.

SUMMARY

A display apparatus may include, but is not limited to: an image display device; and a fiber optic plate disposed over a display surface of the image display device.

A method for displaying images may include, but is not limited to: generating an image on a display device; receiving light corresponding to the image at a fiber optic plate; and reducing at least one of luminance asymmetry, luminance non-uniformity, and color shift across a viewing angle of the image display device according to a configuration of the fiber optic plate.

A method for displaying images may include, but is not limited to: generating a stereoscopic image on a display device; receiving light corresponding to the stereoscopic image at a fiber optic plate; and reducing at least one of luminance asymmetry, luminance non-uniformity, and color shift across a viewing angle and could also be capable of reducing/eliminating reverse-stereoscopic effects in the stereoscopic image according to a configuration of the fiber optic plate.

BRIEF DESCRIPTION OF THE DRAWINGS

The disclosure will become more fully understood from the following detailed description, taken in conjunction with the accompanying drawings, wherein like reference numerals refer to like elements, in which Figure Reference No.

DETAILED DESCRIPTION

Figure 1:
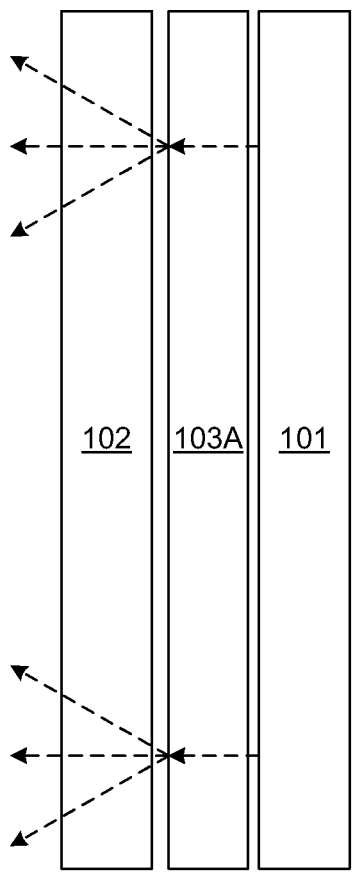
FIG. 1 illustrates an image display apparatus.

Before describing in detail the particular improved system and method, it should be observed that the invention may include, but may be not limited to a novel structural combination of conventional data/signal processing components and circuits, and not in the particular detailed configurations thereof. Accordingly, the structure, methods, functions, control and arrangement of conventional components, software, and circuits have, for the most part, been illustrated in the drawings by readily understandable block representations and schematic diagrams, in order not to obscure the disclosure with structural details which will be readily apparent to those skilled in the art, having the benefit of the description herein. Further, the invention may not be limited to the particular embodiments depicted in the exemplary diagrams, but should be construed in accordance with the language in the claims.

Referring to FIG. 1, an exemplary display system 100 is depicted. The display system 100 may include a light source 101 (e.g. a light-emitting diode (LED), organic LED, cold cathode fluorescent lamp (CCFL), and the like), at least one transmissive display 102, (e.g. a transmissive electro-optical device such as a liquid crystal display, a suspended particle display, and the like). The display system 100 may further include an optical diffuser layer 103A configured to diffuse light emitted by the light source 101 in order to enhance uniformity of the light distribution across the transmissive display 102.

Figure 2A:
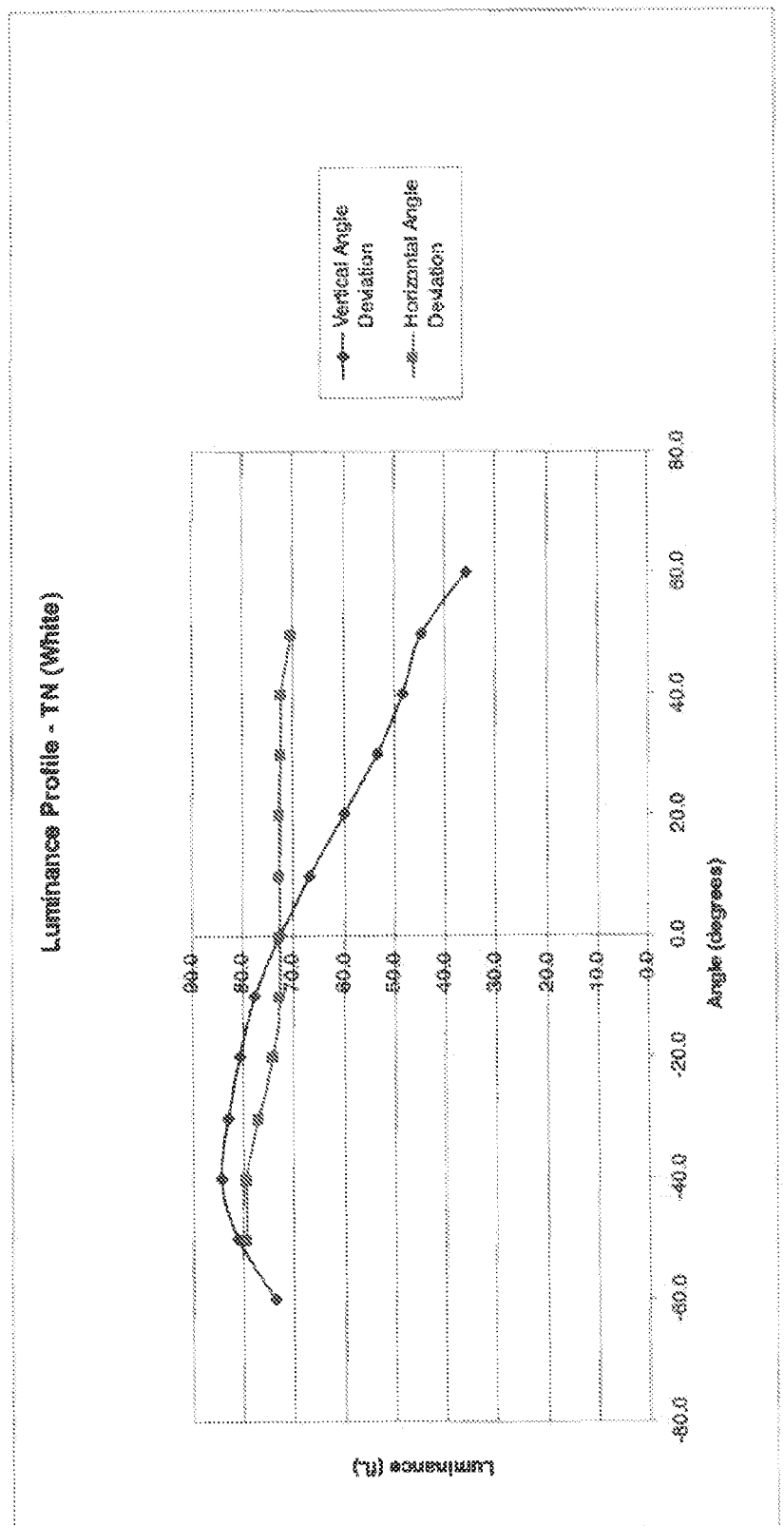
FIG. 2A illustrates luminance profile.
Figure 2B:
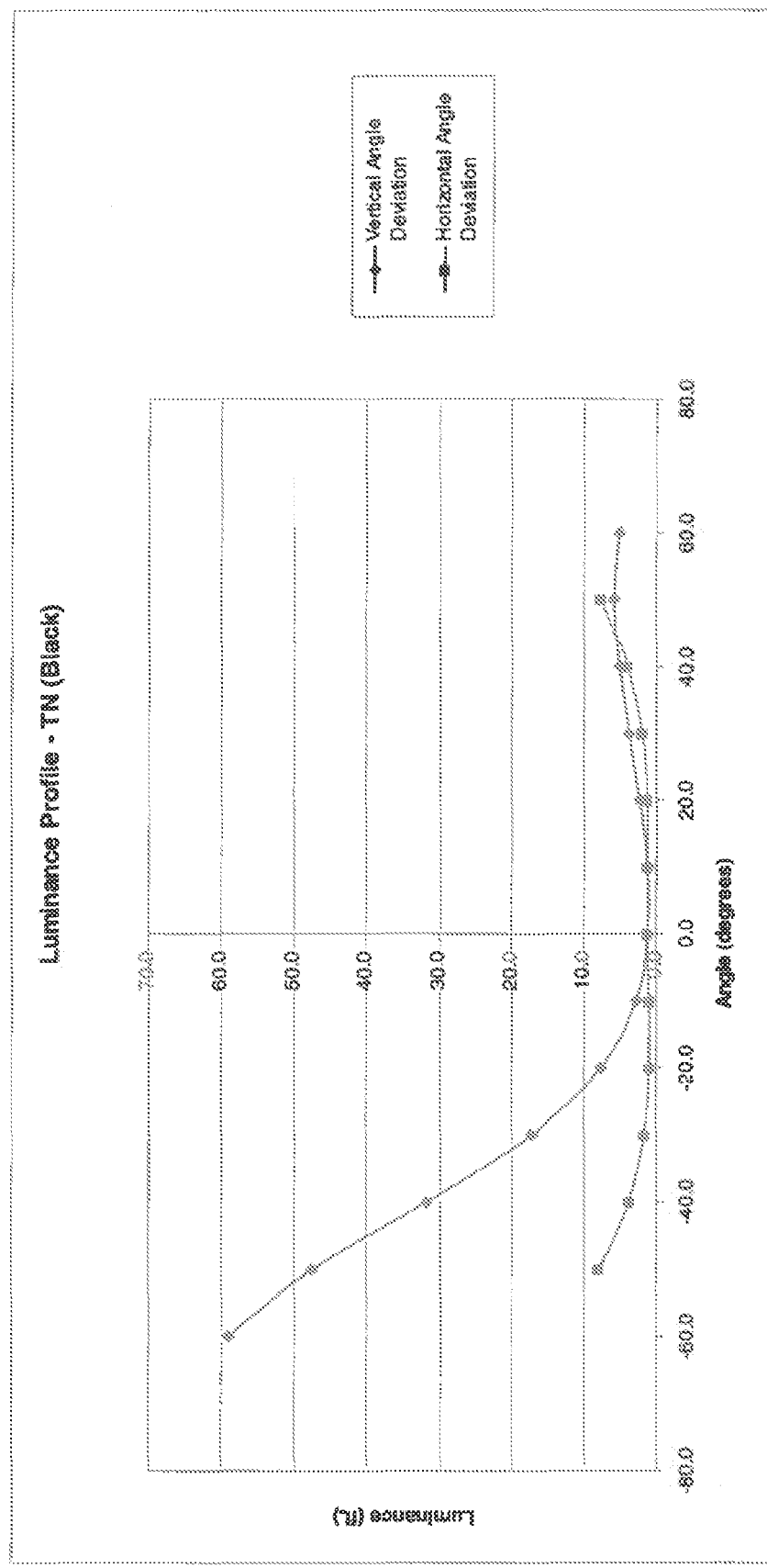
FIG. 2B illustrates luminance profile.

For example, as shown in FIGS. 2A and 2B, luminance profiles across various vertical and horizontal viewing angles are shown for twisted nematic LCD displays in white mode and black mode, respectively. Referring to FIG. 2A, a luminance profile for the white mode is shown across various vertical and horizontal viewing angles. It will be noted that, across varying vertical angles, the luminance profile exhibits both asymmetry and non-uniformity. Further, it will be noted that, across varying horizontal angles, the luminance profile exhibits also exhibits both asymmetry and non-uniformity.

Referring to FIG. 2B, a luminance profile for the black mode is shown across various vertical and horizontal viewing angles. It will be noted that, across varying vertical angles, the luminance profile exhibits both asymmetry and non-uniformity.

Figure 2C:
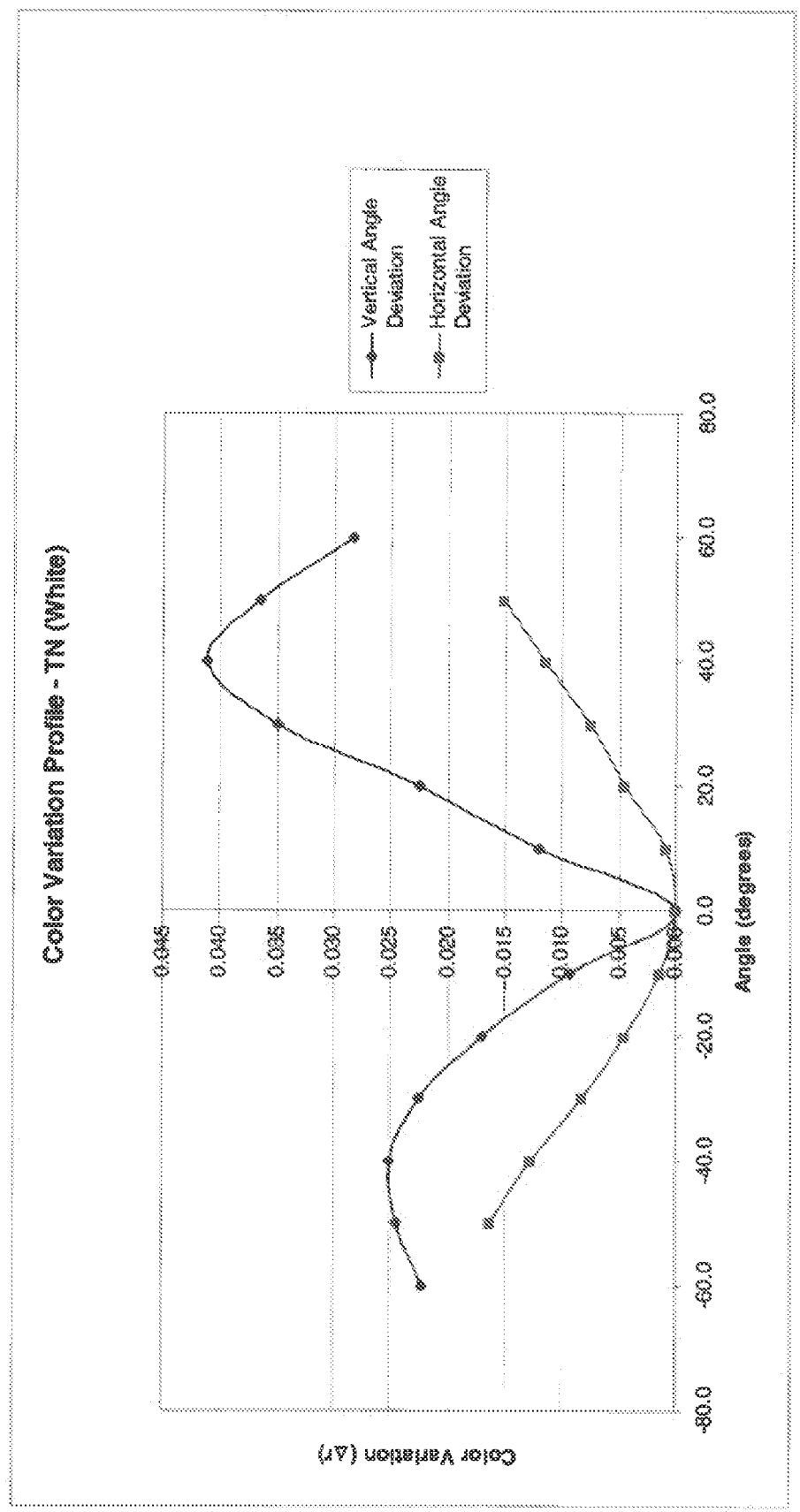
FIG. 2C illustrates a color shift profile.
Figure 2D:
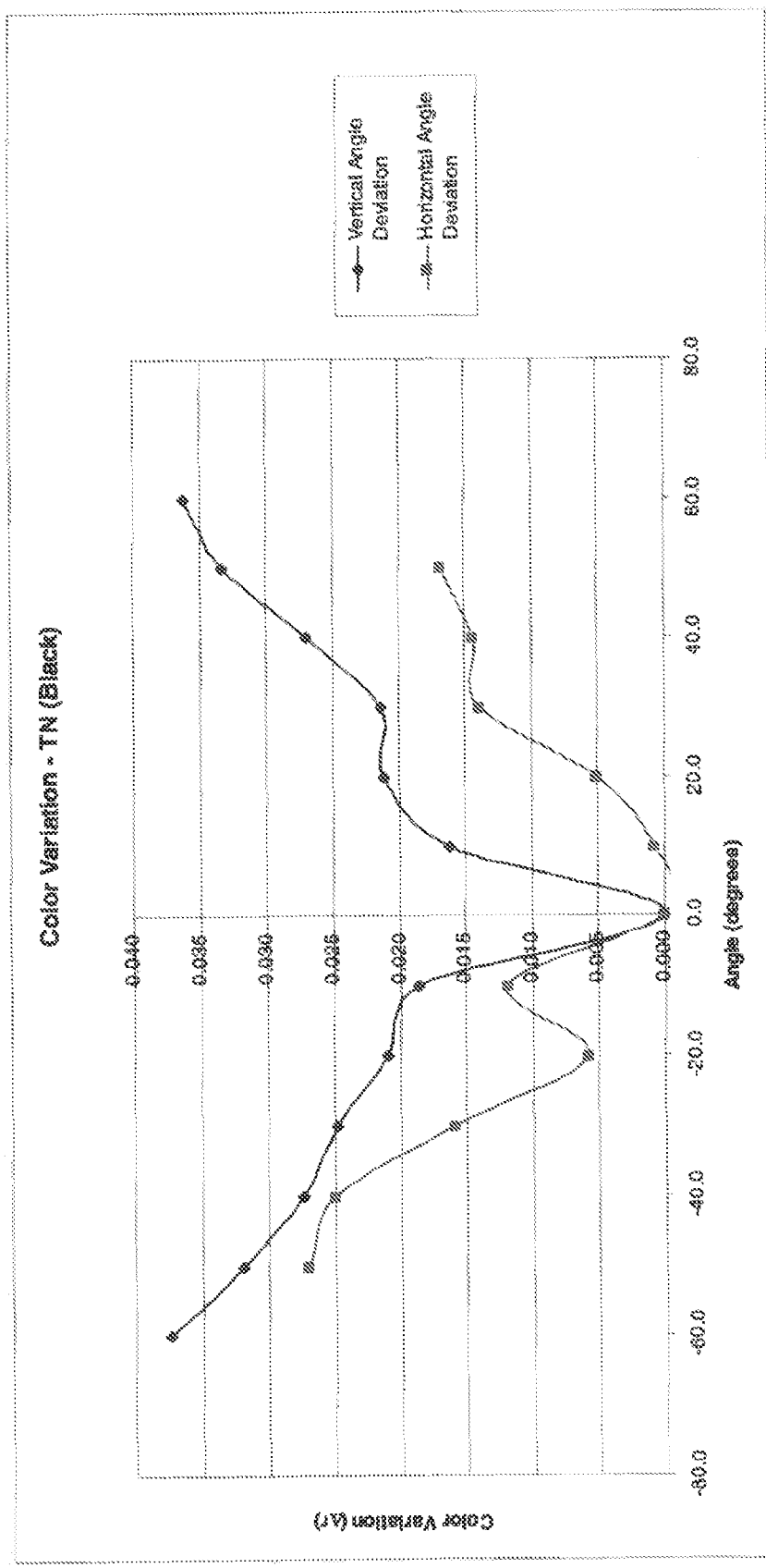
FIG. 2D illustrates a color shift profile.

For example, as shown in FIGS. 2C and 2D, color variation profiles across various vertical and horizontal viewing angles are shown for twisted nematic LCD displays in white mode and black mode, respectively. Referring to FIG. 2C, a color variation profile for the white mode is shown across various vertical and horizontal viewing angles. It will be noted that, across varying vertical angles, the color variation profile exhibits large color shifts.

Referring to FIG. 2D, a color variation profile for the black mode is shown across various vertical and horizontal viewing angles. It will be noted that, across varying vertical angles, the color variation profile exhibits large color shifts. Further, it will be noted that, across varying horizontal angles, the color variation profile exhibits large color shifts.

In light of the asymmetric/non-uniform luminance profiles and color shifts of a display employing an optical diffuser layer 103, it may be desirable to provide a display system that does not rely solely on an optical diffuser layer 103 for light distribution.

Figure 3:
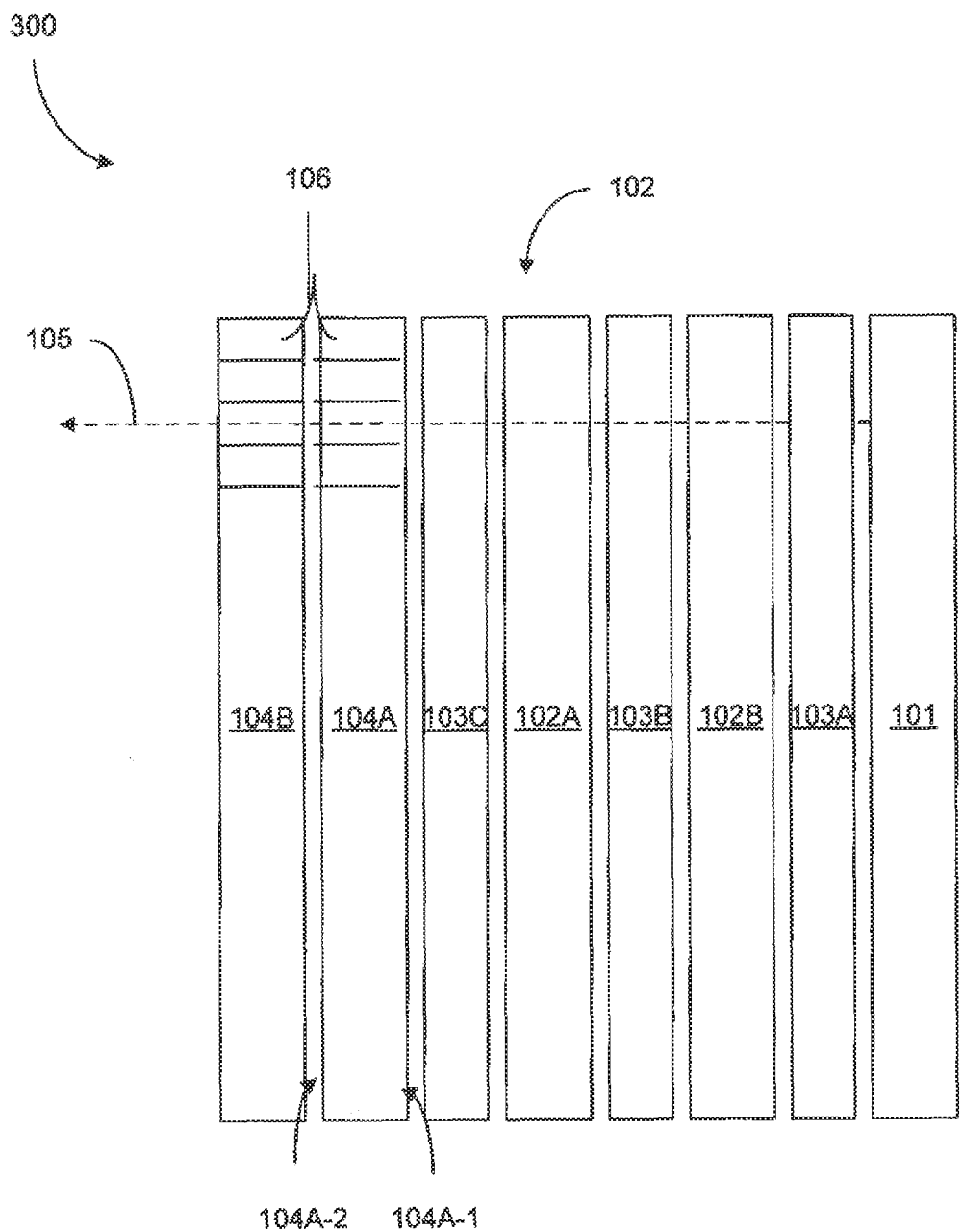
FIG. 3 illustrates an image display apparatus including a fiber optic face plate.

Referring to FIG. 3, an exemplary display system 300 is depicted. The display system 300 may include a light source 101 (e.g. a light-emitting diode (LED), organic LED, cold cathode fluorescent lamp (CCFL), and the like), at least one transmissive display 102, (e.g. a transmissive electro-optical device such as a liquid crystal display, a suspended particle display, and the like). The transmissive display 102 may be a multi-layer LCD display including a first LCD panel 102A and a second LCD panel 102B. The display system 300 may further include a fiber optic plate 104A. The fiber optic plate 104 may be configured to receive light 105 emitted by the light source 101 and retransmit at least a portion of that light to a viewer. The fiber optic plate 104A may include a plurality of optical fibers 106. The optical fibers 106 may be constructed from silica, plastics and the like. The optical fibers 106 may be aligned in a parallel manner so as to form an input surface 104A-1 and an output surface 104A-2. The fiber optic plate 104 may be configured to be affixed to the transmissive display 102 (e.g. sized according to the transmissive display, having at least one surface shape corresponding to a surface shape of the transmissive display 102 to which the fiber optic plate 104 is to be affixed, including one or more mechanisms for coupling the fiber optic plate 104 to the transmissive display 102. The fiber optic plate 104 may be disposed on a transmissive display 102 by various means (e.g. affixed via a pressure sensitive adhesive as described in U.S. patent application Ser. Nos. 12/009,375 and 12/009,482, incorporated herein in their entirety to the extent not inconsistent herewith). Further, the display system 300 may include a second fiber optic plate 104B having a numerical aperture greater than that of the fiber optic plate 104A.

The display system 300 may further include at least one optical diffuser layer 103. For example, the display system 300 may include an optical diffuser layer 103A when the display system 300 is an autostereoscopic display or spatially multiplexed display, as will be described below. The display system 300 may further include a second optical diffuser layer 103 (e.g. an optical diffuser layer 103B and/or an optical diffuser layer 103). A second optical diffuser layer 103 (e.g. either an optical diffuser layer 103B or optical diffuser layer 103C) may be employed in the case where the display system 300 is a variable angle polarization display, as will be described below. The optical diffuser layers 103 may be employed to reduce Moiré patterns. However, if the optical diffuser layer 103A, 103B or 103C produces too much light scattering, a viewer may observe degradation in image quality.

Figure 4:
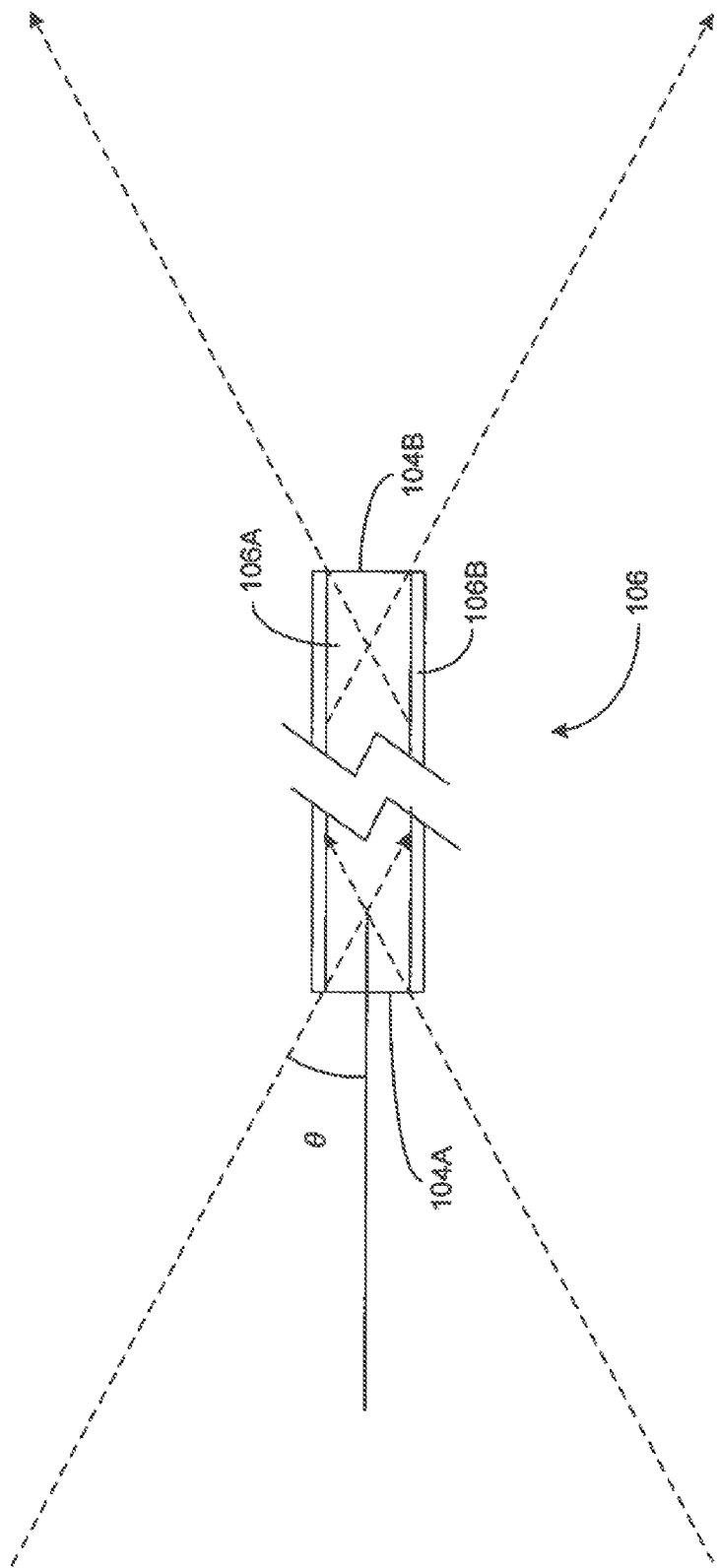
FIG. 4 illustrates optical characteristics of an optical fiber.

Referring to FIG. 4, each optical fiber 106 may be configured to have an associated numerical aperture. The numerical aperture (NA) of an optical fiber 106 may be defined as:

$$NA = \sqrt{N_1^2 - N_2^2}$$

where $N_1$ is the index of refraction of the core glass 106A and $N_2$ is the index of refraction of the cladding glass 106B of the optical fiber 106.

The numerical aperture of the optical fiber 106 is related to an angle of acceptance θ (e.g. the angle within which light incident on the input surface 104A-1 of an optical fiber 106 is transmitted by the optical fiber 106 and outside of which is reflected away from the input surface 104A-1) by:

$$\theta = \sin^{-1}(NA)$$

The acceptance field of view (e.g. 2θ) of an optical fiber 106 may be configured through manipulation of the respective refractive indices of the core glass 106A and/or cladding glass 106B.

Figure 5B:
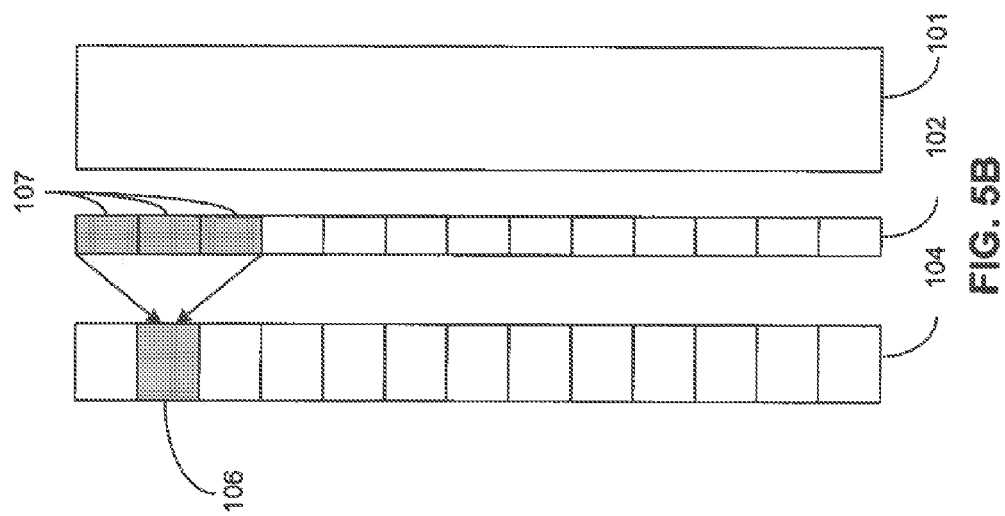
FIG. 5B illustrates angles of acceptance of an optical fiber.
Figure 5A:
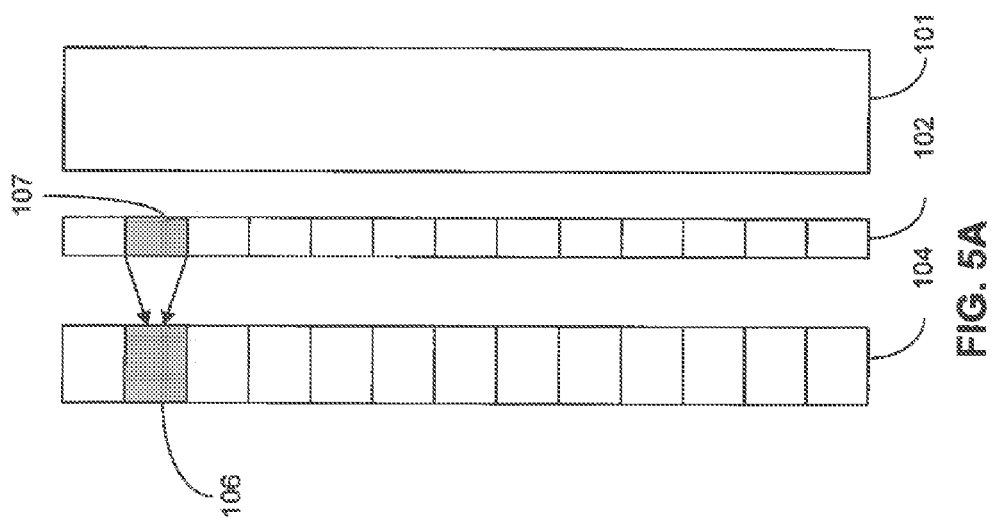
FIG. 5A illustrates angles of acceptance of an optical fiber.

Referring to FIG. 5A an optical fiber 106 of the fiber optic plate 104 having a smaller numerical aperture may receive light from a single pixel 107 of the transmissive display 102 to avoid cross-talk with other pixels 107. Referring to FIG. 5B, an optical fiber 106 of the fiber optic plate 104 having a larger numerical aperture may receive light from more than one pixel 107 of the transmissive display 102 to enhance luminance.

Figure 6A:
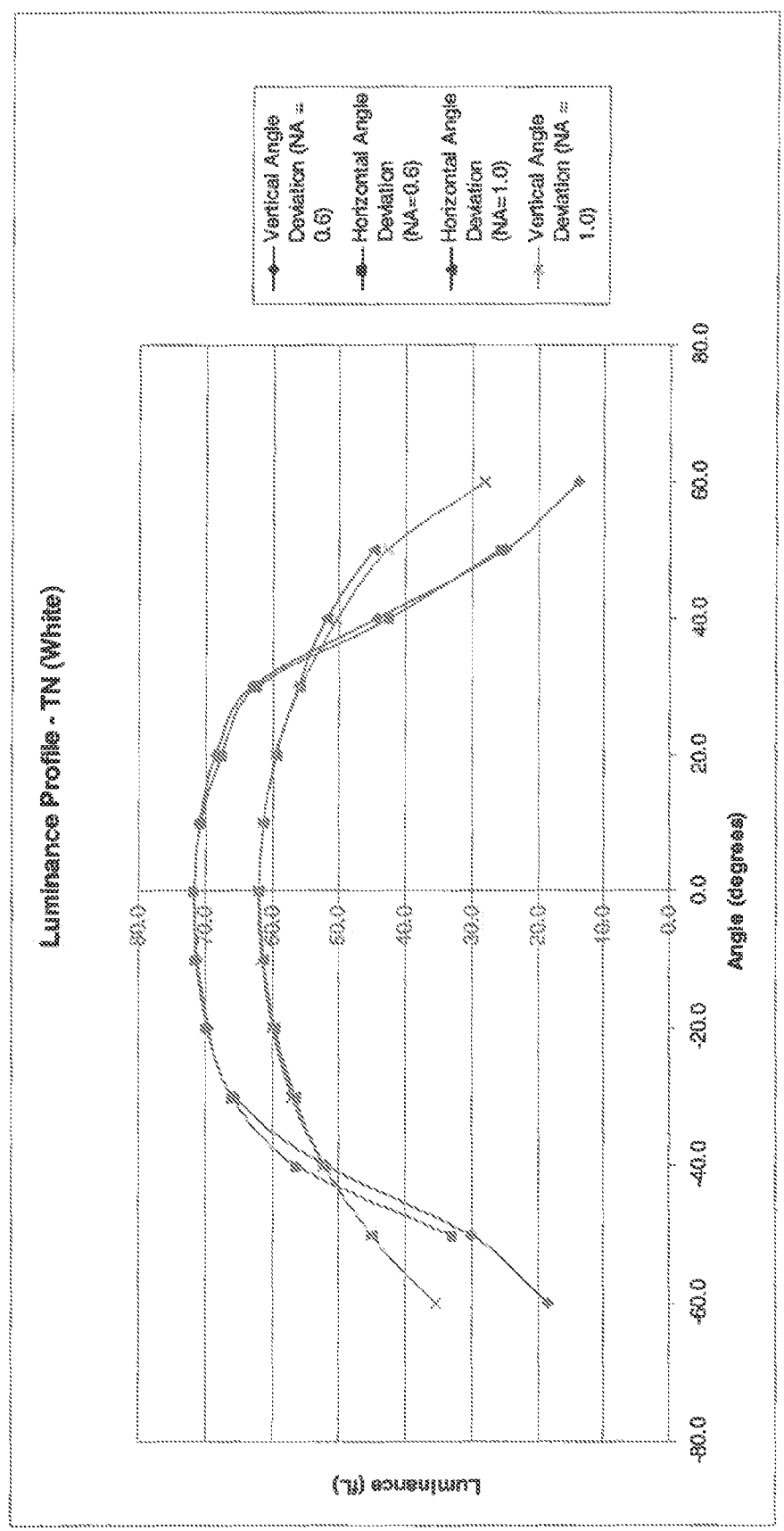
FIG. 6A illustrates a luminance profile.
Figure 6B:
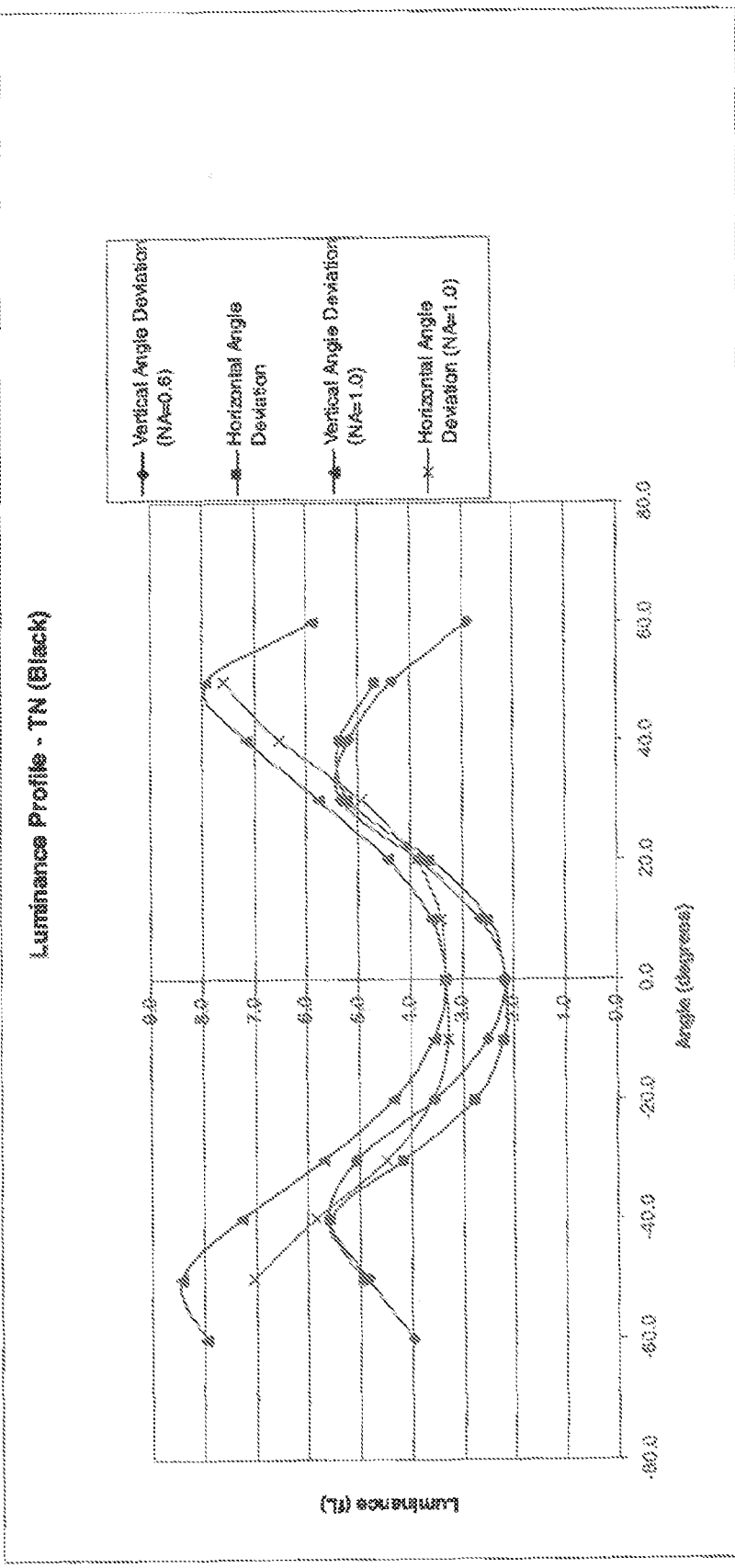
FIG. 6B illustrates a luminance profile.

Referring to FIGS. 6A and 6B, luminance profiles across various vertical and horizontal viewing angles for twisted nematic LCD displays incorporating fiber optic plates having various numerical apertures are shown for white mode and black mode, respectively. Referring to FIG. 6A, a luminance profile for the white mode is shown across various vertical and horizontal viewing angles when utilizing fiber optic plates having a numerical aperture of 0.6 and 1.0. It will be noted that, across varying vertical angles, the luminance profile exhibits both symmetry and uniformity as compared to the luminance profile of FIG. 2A.

Referring to FIG. 6B, a luminance profile for the black mode is shown across various vertical and horizontal viewing angles when utilizing fiber optic plates having a numerical aperture of 0.6 and 1.0. It will be noted that, across varying vertical angles, the luminance profile exhibits both greater symmetry and uniformity as compared to the luminance profile of FIG. 2B.

Figure 6C:
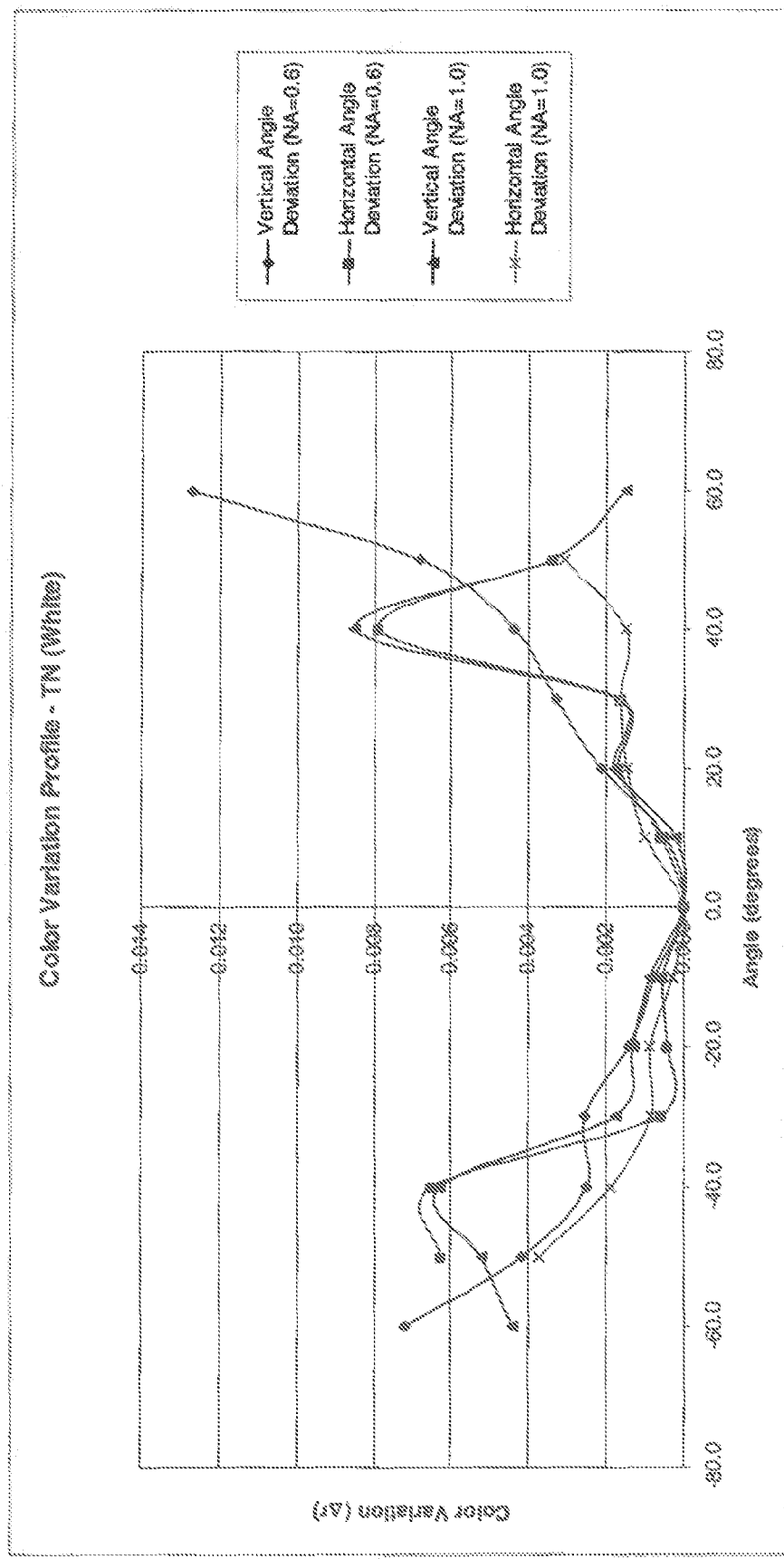
FIG. 6C illustrates a color shift profile.
Figure 6D:
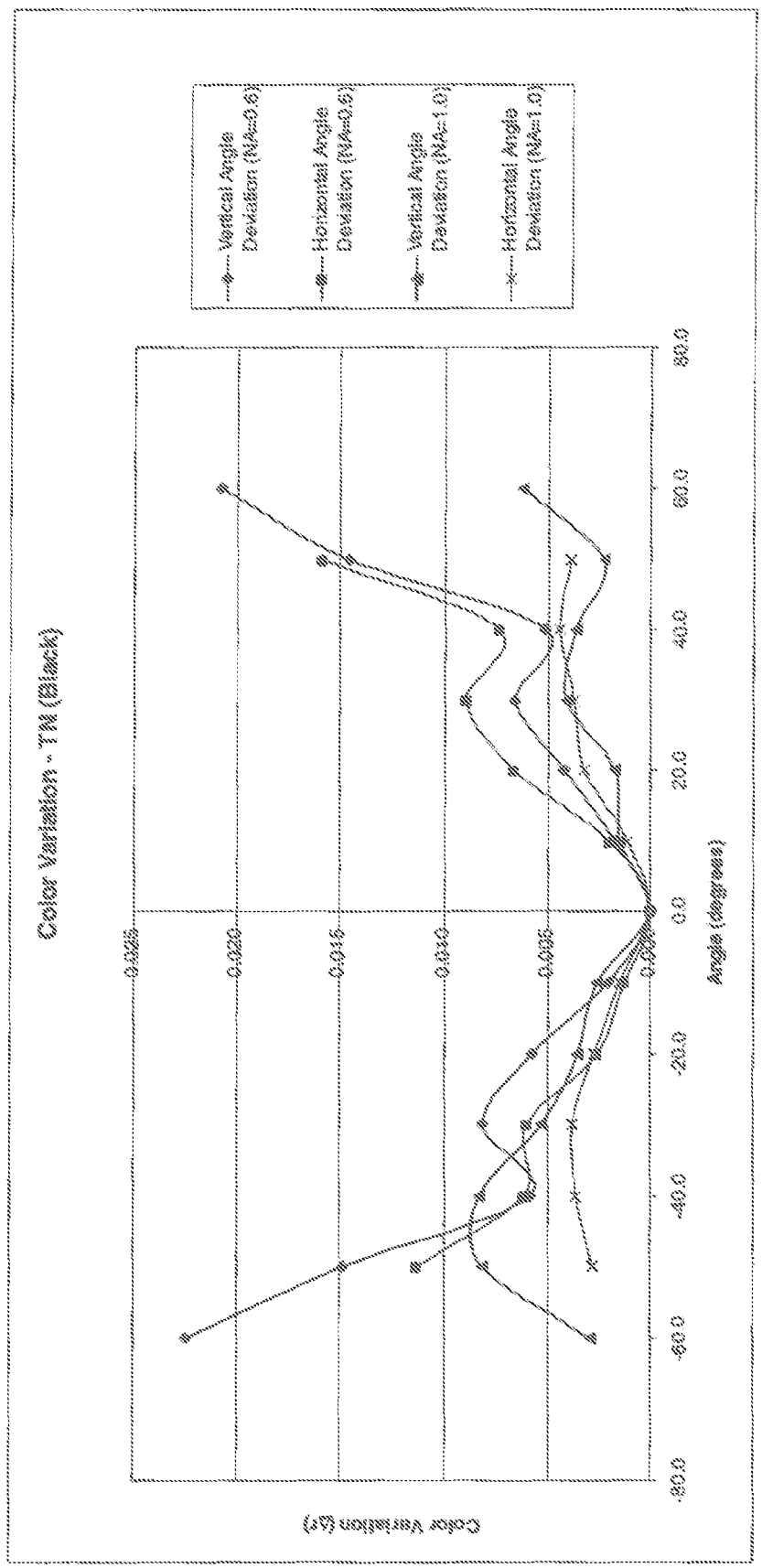
FIG. 6D illustrates a color shift profile.

Referring to FIGS. 6C and 6D, color variation profiles across various vertical and horizontal viewing angles are shown for twisted nematic LCD displays incorporating fiber optic plates having various numerical apertures are shown for white mode and black mode, respectively. Referring to FIG. 6C, a color variation profile for the white mode is shown across various vertical and horizontal viewing angles when utilizing fiber optic plates having a numerical aperture of 0.6 and 1.0. It will be noted that, across varying vertical angles, the color variation profile reduced color shifts as compared to the color variation profile of FIG. 2C.

Referring to FIG. 6D, a color variation profile for the black mode is shown across various vertical and horizontal viewing angles when utilizing fiber optic plates having a numerical aperture of 0.6 and 1.0. It will be noted that, across varying vertical angles, the color variation profile exhibits reduced color shifts as compared to the color variation profile of FIG. 2D.

As shown if FIGS. 6A-6D, the use of a fiber optic plate 104 may increase luminance and color uniformity across varying vertical angles as compared to a system that does not include a fiber optic plate 104 (as shown in the luminance and color variation profiles of FIGS. 2A-2D).

Stereoscopic images are perceived when each eye sees a slightly different image. Usually two sets of images are recorded using two independent cameras and the display system exhibits both these displays. The 3D display system 700 may be configured such that each eye sees only images associated with its corresponding channel and while blocking the images corresponding to the opposite channel. The quantitative parameter of the level of blockage may be referred to as crosstalk. Cross talk may be defined as a percentage of an incorrect images being transmitted to the eye of an observer (i.e. the amount of the left/right image seen by the right/left eye respectively). When cross talk is large, ghosting may occur. When an eye sees the primary image corresponding to the opposite channel, the effect is known as reverse stereo, pseudo stereo or reverse stereopsis. Over an extended period of time this causes eye strain and headaches.

As stereo display systems exhibit both the L/R images, they may be limited to smaller viewing angles and the color and luminance variations may be large. Utilization of a fiber optic faceplate with a display may make it possible to overcome such drawbacks.

Referring again to FIG. 3, display system 300 may be a stereoscopic display system. The transmissive display 102B closest to the light source 101 may be configured to display an image corresponding to the average brightness between a stereoscopic image pair. Each pixel of the transmissive display 102A closest to the viewer may impart a particular angular rotation to light 105 produced by each corresponding pixel of the transmissive display 102B based on the relative brightness of the left and right images and their respective colors. Such a configuration may be referred to as variable angle polarization.

In the case of such variable angle polarization, there may be relatively large color, contrast, luminance difference between the stereoimages for each eye. Such variations may increase significantly upon deviation of a viewing perspective away from a normal orientation to 3D display system 300 the resulting in a reduced acceptable viewing angle. As such, the 3D display system 300 may include a fiber optic plate 104. By using a high N.A. fiber optic plate 104 disposed between the transmissive display 102A and a viewer, the effects of head movement may be reduced as the viewing angle over which the image may be viewed normal to the display are increased.

Figure 7:
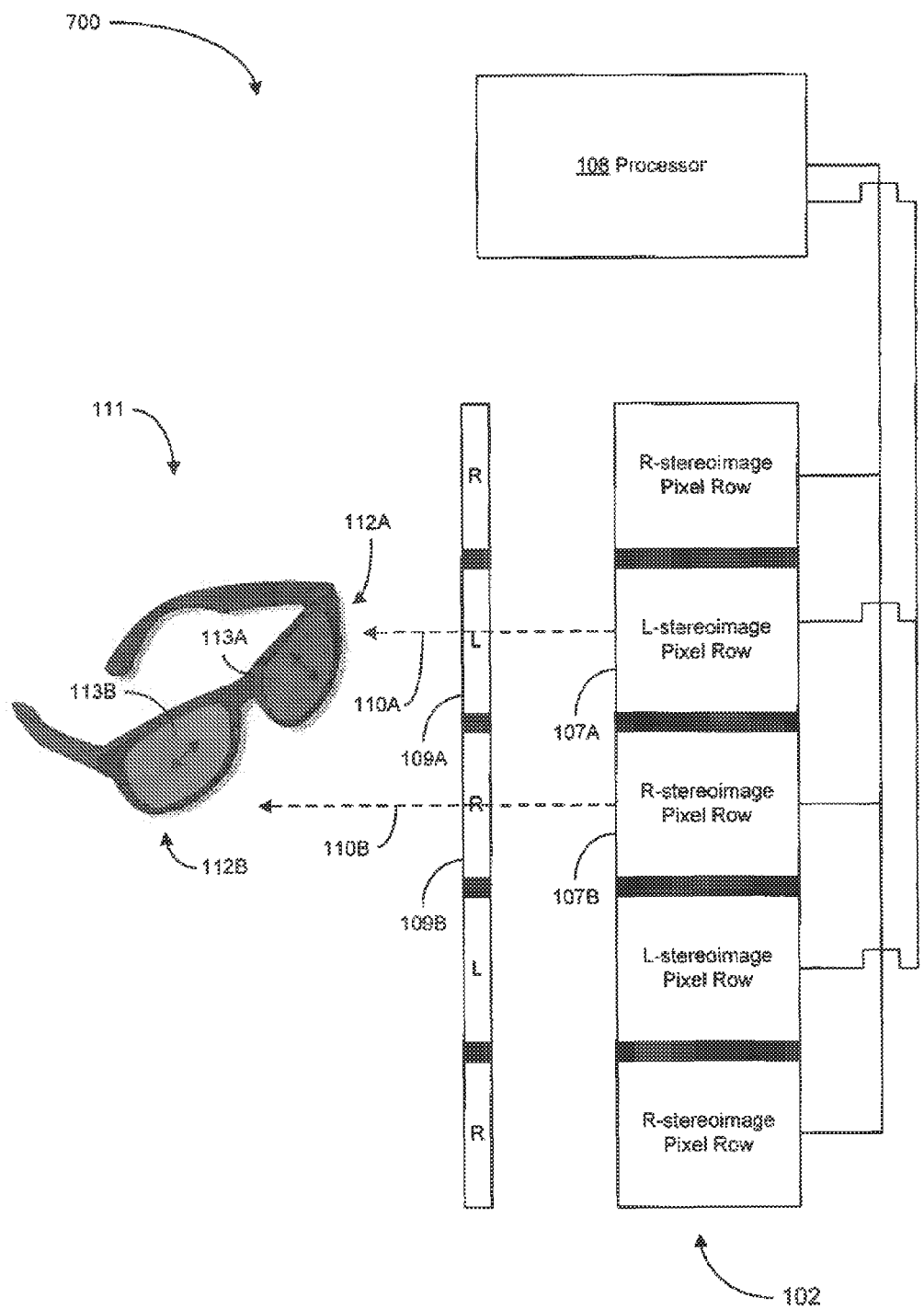
FIG. 7 illustrates a stereoscopic display apparatus.

Referring to FIG. 7, a stereoscopic (e.g. 3D) display system 700 is depicted. The 3D display system 700 may include a transmissive display 102 (e.g. a transmissive electro-optical device such as a liquid crystal display, a suspended particle display, and the like) which may be configured to display 3D images in the form of a stereo image pair including left and right images. The transmissive display 102 may be controlled by a stereoscopic image processor 108. The processor 108 may provide image data associated with a left-channel of a stereoscopic image pair to a first row of pixels 107A of the transmissive display 102 and image data associated with a right-channel of a stereoscopic image pair to a second row of pixels 107B of the transmissive display 102. The row of pixels 107A and row of pixels 107B may be interlaced in a horizontal or vertical manner.

The 3D display system 700 may include a polarization layer 109. Light from each pixel of the transmissive display 102 may be directed to a portion (e.g. portion 109A, portion 109B) of the polarization layer 109 configured to impart a particular polarization on an output beam 110 emitted from the polarization layer 109. For example, the polarization layer 109 may include a portion 109A configured to impart a first polarization (e.g. vertical polarization) on an output beam 110A emitted from the portion 109A and a portion 109B configured to impart a second polarization (e.g. horizontal polarization) on an output beam 110B emitted from the portion 109B. The portion 109A and the portion 109B may be configured such that output beam 110A is orthogonally polarized with respect to output beam 110B.

The 3D display system 700 may be configured to operate in conjunction with polarized glasses 111. The polarized glasses 111 may include a viewing lens 112A and a viewing lens 112B. Each viewing lens 112 may include a base substrate (e.g. a glass substrate) and a lens polarization layer 113. The polarizations of the respective lens polarization layers 113 associated with the viewing lens 112A and the viewing lens 112B may be such that, when a viewer's polarized glasses 111 filter the output beam 110A, the lens polarization layer 113A of a left viewing lens 112A transmits only the left channel of the stereoscopic image and the right lens polarization layer 113B of the right viewing lens 112B transmits only the right channel of the stereoscopic image, thereby enabling the viewer to see a complete stereo image. For example, the lens polarization layer 113A and the lens polarization layer 113B may be configured to have substantially orthogonal polarizations (e.g. as depicted in FIG. 7). This configuration can be referred to as a spatially multiplexed display.

Figure 8:
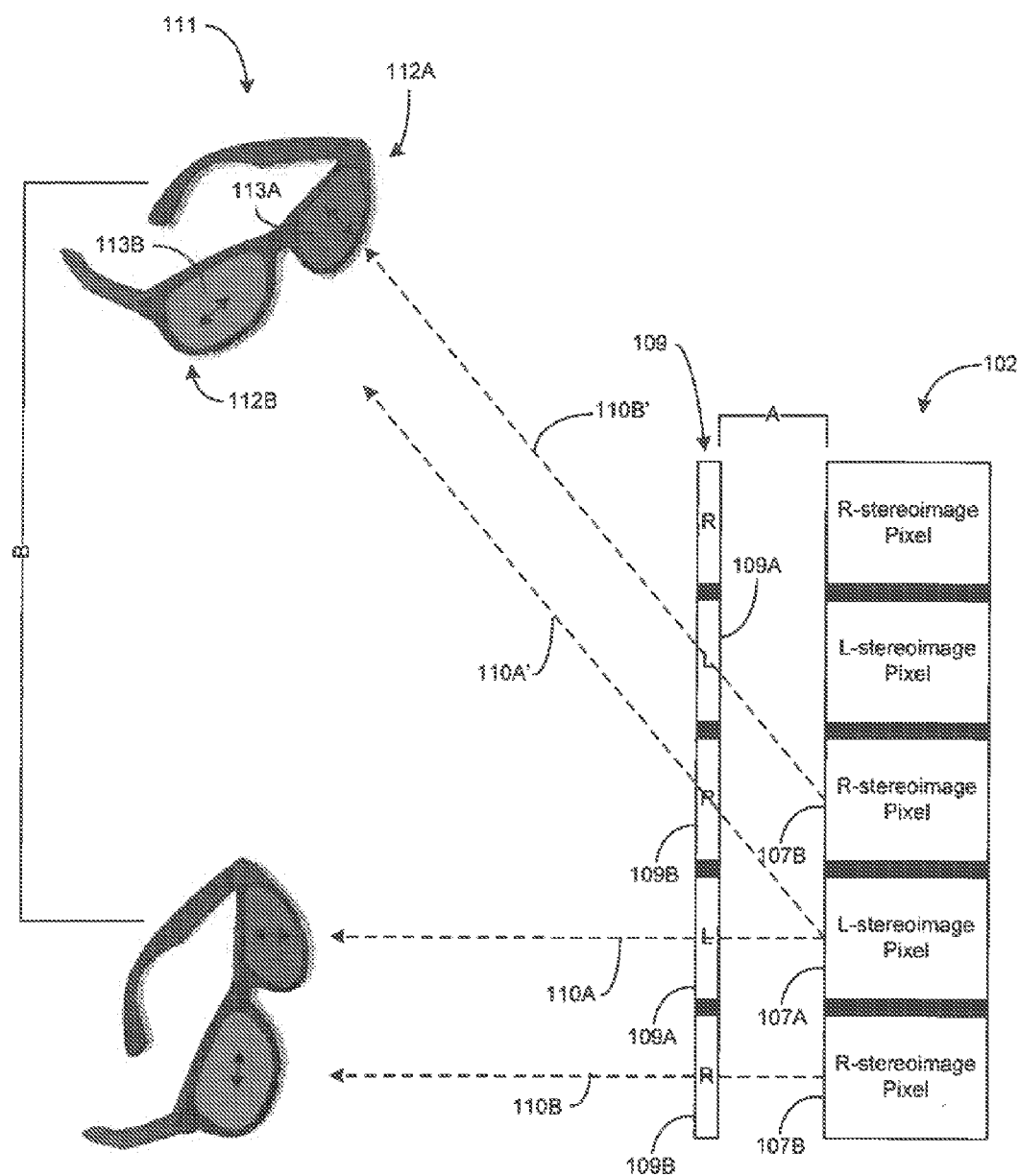
FIG. 8 illustrates reverse stereoscopic effects of a stereoscopic display.

Referring to FIG. 8, the polarization layer 109 may be located a distance A away from the transmissive display 102. As such, it may be the case that, during high-angle viewing by a viewer 113 (e.g. viewing at a vertical distance B above a line of sight normal to the transmissive display 102), the 3D display system 700 may exhibit reverse-stereoscopic behavior. For example, output beam 110A' emitted by a pixel 107A associated with a left-channel of a stereoscopic image may pass through portion 109B of the polarization layer 109 which corresponds to the right viewing lens 112B of the polarized glasses 111. Similarly, output beam 110B' emitted by a pixel 107B associated with a right-channel of a stereoscopic image may pass through portion 109A of the polarization layer 109 which corresponds to the left viewing lens 112A of the polarized glasses 111.

In order counteract the reverse-stereoscopic effects, the 3D display system 700 may further include a fiber optic plate 104.

Figure 9:
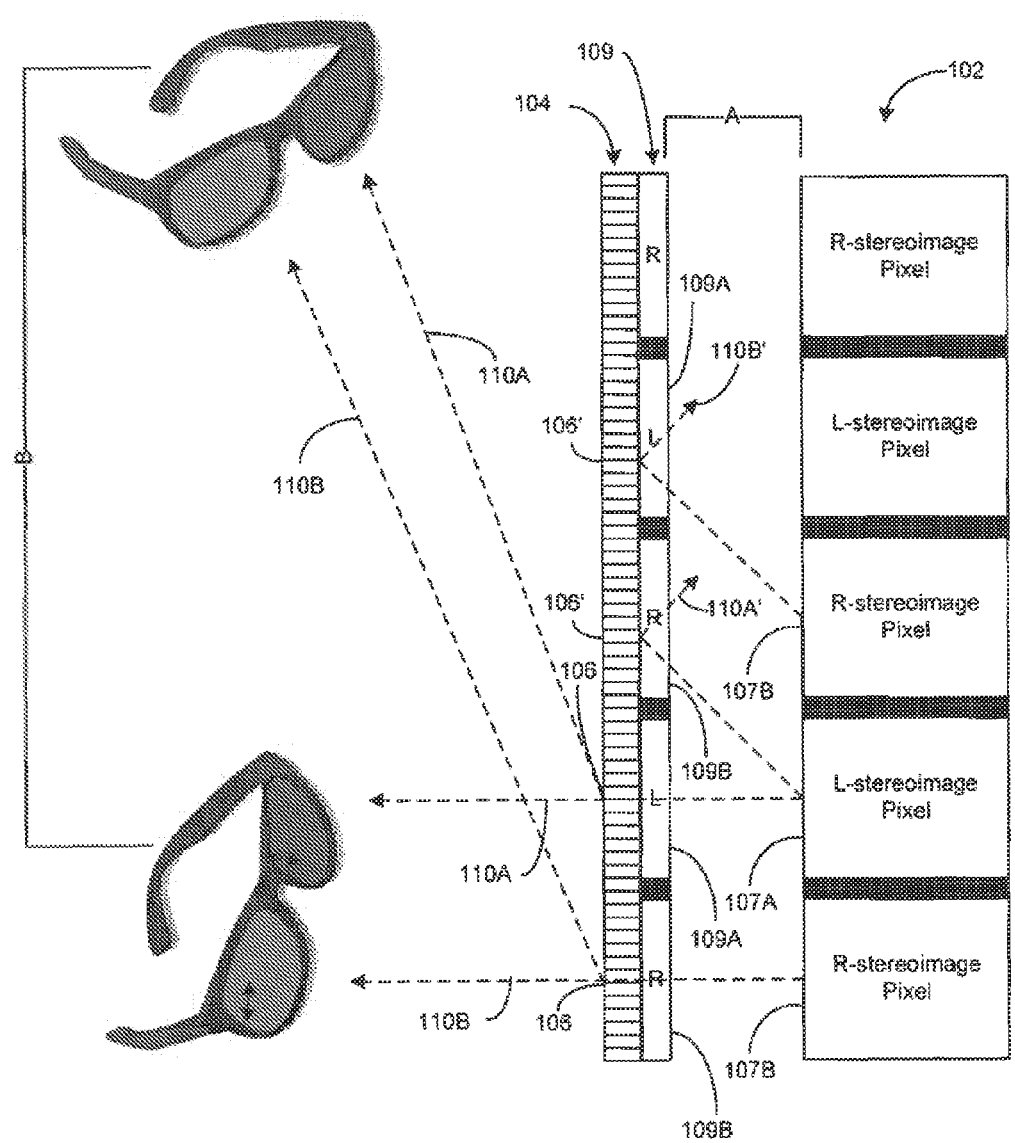
FIG. 9 illustrates a stereoscopic display apparatus including a fiber optic face plate.
Figure 10:
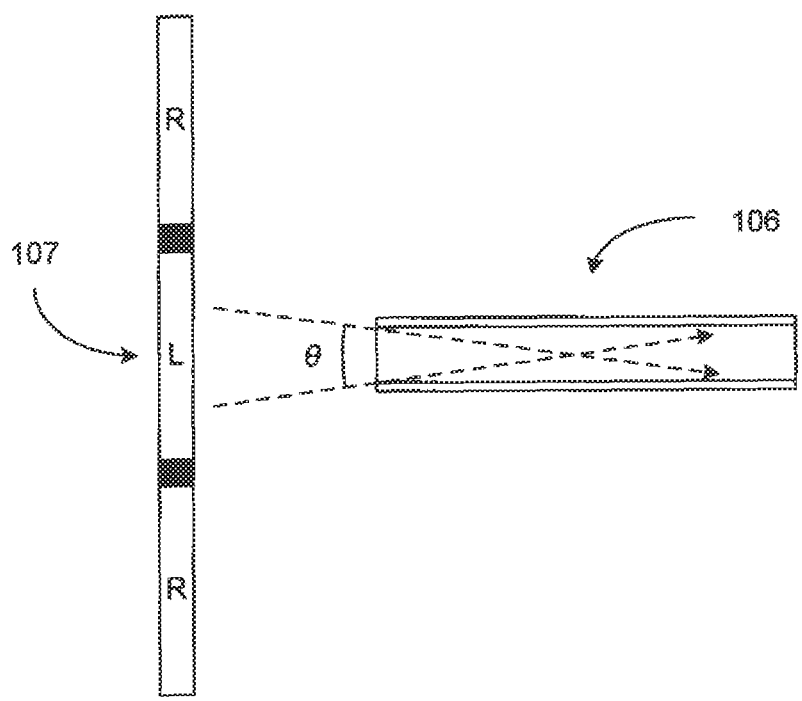
FIG. 10 illustrates optical characteristics of an optical fiber.

Referring to FIG. 9, one or more optical fibers 106 of the fiber optic plate 104 may be configured such that the numerical aperture of the optical fibers 106 results in an angle of acceptance θ that is small enough that output beam 110A' emitted by left-channel pixel 107A and output beam 110B' emitted by right-channel pixel 107B which pass through right-polarization portion 109B and left-polarization portion 109A, respectively, are reflected by the optical fibers 106' while output beam 110A emitted by left-channel pixel 107A and output beam 110B emitted by right-channel pixel 107B which pass through left-polarization portion 109A and right-polarization portion 109B, respectively, are accepted by the optical fibers 106. For example, as shown in FIG. 10, an optical fiber 106 may have a numerical aperture configured such that the angle of acceptance θ of optical fiber 106 is such that only light emitted by pixel 107A associated with a single stereoscopic channel (e.g. a left channel) may be received by the optical fiber 106.

Figure 11:
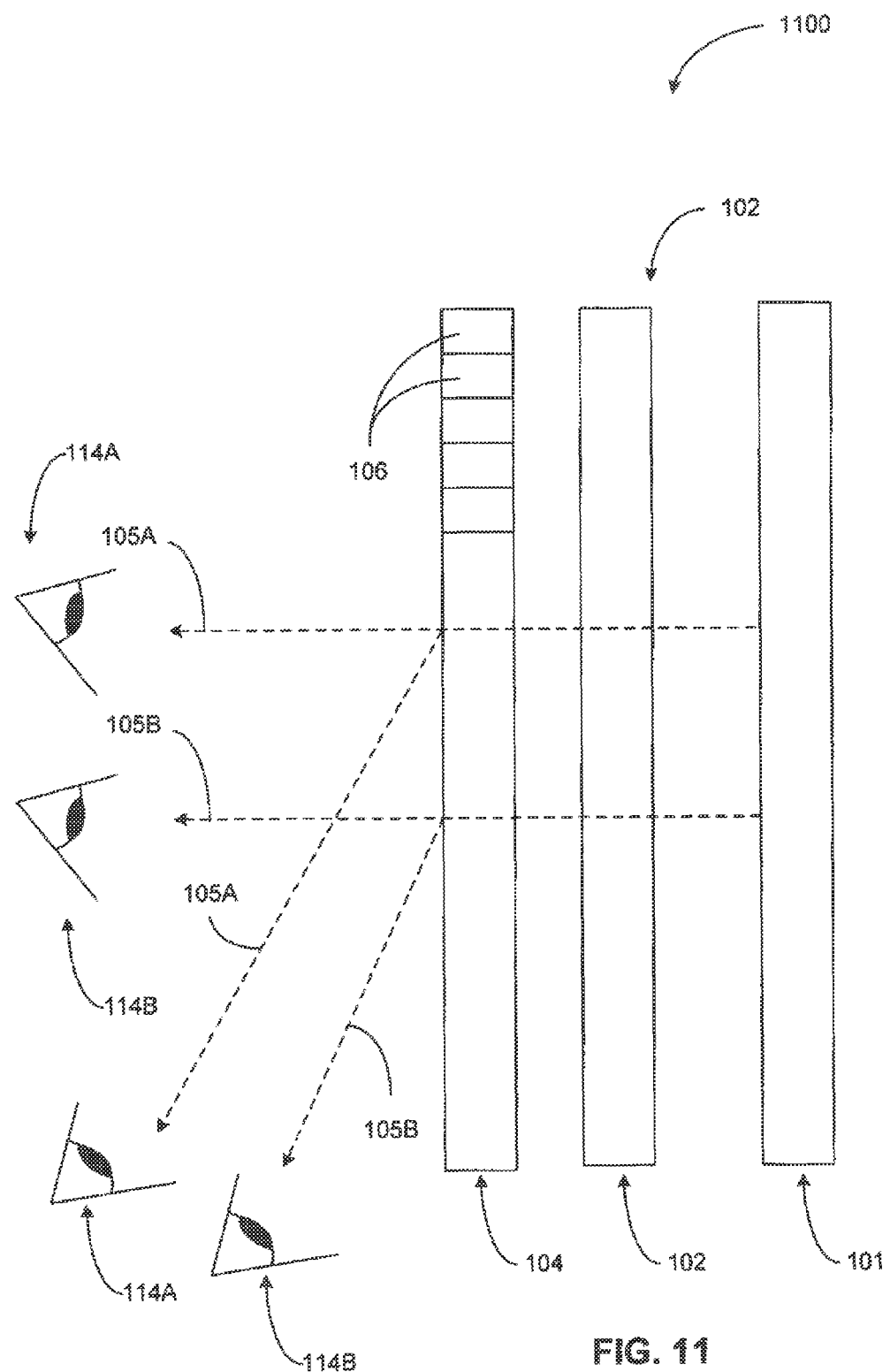
FIG. 11 illustrates an autostereoscopic display

Referring to FIG. 11, an autostereoscopic display 1100 is shown. The autostereoscopic display 1100 may include a transmissive display 102 configured to display a left-channel and a right-channel portion of a stereoscopic image. The transmissive display 102 may be spatially configured such that light 105A from the transmissive display 102 is directed generally toward a left eye 114A of a viewer while that light 105B from the transmissive display 102 is directed generally toward a right eye 114B of a view. This is typically achieved by using lenticular lens array or parallax barrier or any other similar methods.

In such a configuration, the viewing angle for the autostereoscopic display 1100 is relatively small. Even limited head movement may result in the degradation of the 3D effect (e.g. crossover between the right and left eye images may result in reverse stereopsis). As such, the autostereoscopic display 1100 may include a fiber optic plate 104. By using a high N.A. fiber optic plate 104 disposed between the transmissive display 102A and a viewer, the effects of head movement may be reduced. In this case, the light emerging for head-on or normal viewing may be distributed over a larger angle, facilitating wider viewing angle as well as accommodate multiple viewers without further reduction in resolution.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g. "configured to") can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those that are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to" or other past-tense adjectives are generally not intended to exclude such variants, unless context dictates otherwise.

Although specific dependencies have been identified in the claims, it is to be noted that all possible combinations of the features of the claims are envisaged in the present application, and therefore the claims are to be interpreted to include all possible multiple dependencies. It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

Although particular embodiments of this invention have been illustrated, it is apparent that various modifications and embodiments of the invention may be made by those skilled in the art without departing from the scope and spirit of the foregoing disclosure. Accordingly, the scope of the invention should be limited only by the claims appended hereto.

What is claimed is:

1. A display apparatus comprising:
   a stereoscopic display device including:
   a variable angle polarization display device including:
   a first transmissive display panel and a second transmissive display panel, at least one of the first transmissive display panel and the second transmissive display panel including:
   one or more pixels associated with a left channel of a stereoscopic image pair,
   one or more pixels associated with a right channel of a stereoscopic image pair, and
   a polarization layer including:
   a portion configured to impart a first polarization associated with the left channel of a stereoscopic image pair; and a portion configured to impart a second polarization different than the first polarization and associated with the right channel of a stereoscopic image pair; and a fiber optic plate configured to receive light emitted by the stereoscopic display device the fiber optic plate including:

one or more optical fibers configured to at least partially reflect at least a portion of light emitted from the one or more pixels associated with the left channel of a stereoscopic image pair that is polarized by the second portion configured to impart the second polarization associated with the right channel of the stereoscopic image pair; and one or more optical fibers configured to at least partially reflect at least a portion of light emitted from the one or more pixels associated with a right channel of a stereoscopic image pair that is polarized by the first portion configured to impart the first polarization associated with the left channel of the stereoscopic image pair, wherein the first transmissive display panel, the second transmissive panel and the fiber optic plate are in a stacked configuration.

2. The display apparatus of claim 1, wherein the fiber optic plate is configured to reduce: at least one of luminance asymmetry, luminance non-uniformity, and color shift across viewing angles of the stereoscopic display device.

3. The display apparatus of claim 1, wherein the fiber optic plate comprises:

at least one optical fiber having a numerical aperture of from 0.6 to 1.0.

4. The display apparatus of claim 1, wherein the fiber optic plate is configured to reduce reverse-stereoscopic effects associated with the stereoscopic display device.

5. The display apparatus of claim 1, wherein the stereoscopic display device comprises:

an autostereoscopic display device.

6. The display apparatus of claim 1, further comprising:

a second fiber optic plate disposed in a position between the fiber optic plate and the viewer.

7. The display apparatus of claim 6, wherein the second fiber optic plate has a numerical aperture greater than that of the fiber optic plate.

8. The display apparatus of claim 1, wherein the fiber optic plate comprises:

one or more optical fibers configured to accept light from one or more pixels associated with a single stereoscopic channel.

* * * * *